March 31, 1942.    A. McNAB    2,277,771
OIL SEAL RING FOR PROPELLER SHAFT LUBRICATION
Filed March 7, 1940

INVENTOR
ALEXANDER McNAB
BY John A. Hanrahan
ATTORNEY

Patented Mar. 31, 1942

2,277,771

UNITED STATES PATENT OFFICE 2,277,771

OIL SEAL RING FOR PROPELLER SHAFT LUBRICATION

Alexander McNab, Bridgeport, Conn., assignor to McNab of Bridgeport, Inc., Bridgeport, Conn., a corporation of Connecticut Application March 7, 1940, Serial No. 322,680

1 Claim. (Cl. 286—11)

This invention relates to new and useful improvements in the lubrication of shafts, as ship's propeller shafts, and has particular relation to an improved oil seal ring for propeller and other shaft lubrication.

An object of the invention is to provide an oil seal ring which may be easily and quickly applied to a shaft as to a propeller shaft between the propeller hub and the stern tube end and which means when in place functions efficiently to prevent the loss and waste of lubricant from about the propeller or other shaft and from its bearings and also prevents the entrance of water, sand, mud, dust and other foreign matter into such bearings.

Other objects and advantages will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claim.

Figure 5:
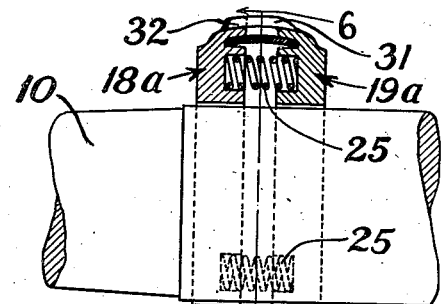
Fig. 5 is a view somewhat similar to Fig. 1 but showing only the seal and shaft and illustrating a modification.

Referring in detail to the drawing and at first more particularly to the form of the invention shown in Figs. 1, 2, 3 and 4, at 10 is shown a portion of a propeller shaft projecting from a ship's stern tube 11 and carrying a propeller, a portion of the hub of which is shown and designated 12. Between the stern tube and the propeller shaft is any or the usual bearing means 13 and as usual the stern tube end 14 is disposed against the outer surface of the ship a portion only of which is shown and designated 15. Any or the usual rope guard 16 may be provided.

Figure 4:
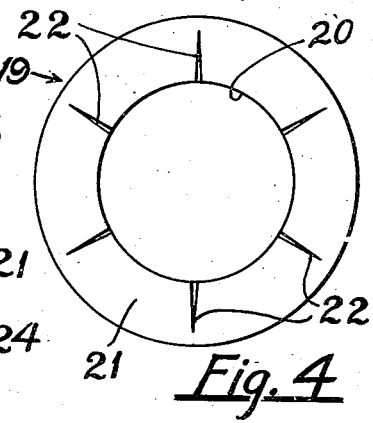
Fig. 4 is an elevational view showing the outer surface of an element of the seal.

Disposed about the shaft 10 between the propeller hub 12 and the stern tube end 14 is my improved seal generally designated 17. Seal 17 comprises a pair of similar rings 18 and 19 each having an opening 20 therethrough of slightly greater diameter than that of the propeller shaft. Each ring includes a smooth outer face or bearing surface 21 which may have the oil grooves 22 therein as shown in Fig. 4. When the seal is in use ring 18 has its surface 21 against the hub of the propeller while the ring 19 has its surface 21 against the outer end 14 of the stern tube.

Thus the rings are arranged in opposing relation and in their opposing surfaces inwardly of their peripherial edges the rings are provided with aligned sockets 23 and 24 within which are located the respective ends of coil springs 25. The springs are held in place by having their respective ends received in the recesses 23 and 24 and it will be apparent from the drawing that said springs serve to maintain the rings 18 and 19 in normally spaced relation with their surfaces 21 bearing against the propeller hub and the stern tube end as above described.

Ring 19 on its inner face, or on its face opposing the ring 18, is provided with dowel pins 26 while the ring 18 in its corresponding face is provided with recesses 27. The dowel pins enter the recesses as shown and the arrangement is such that in the normal relation of the rings the pins 26 do not engage the bottoms of the recesses 27. This is as clearly shown in the drawing and the purpose of such arrangement is to allow for some slight movement of the rings toward and from one another as may be occasioned by longitudinal movement of the propeller shaft as its direction of rotation is reversed.

In their opposing faces toward their peripherial edges the rings are provided with annular channels 28 the upper and lower walls of which taper toward one another as they approach the bottom walls 29 of such channels. These channels 28 receive the respective ends of a continuous tube-like boot 30. Due to the taper of the sidewalls of the channels the end portions of the boot 30 are somewhat compressed as they are forced in such channels and thus due to the engagement between said walls and the boot and between the boot and the bottoms of the channels a liquid-tight seal is provided between the boot and the respective rings 18 and 19.

Boot 30 is of a flexible resilient material of such length that normally it is compressed between the rings 18 and 19. The boot is preferably of a material or compound impervious to both oil and water and must have an inner surface impervious to oil and an outer surface impervious to water. The above is true since while in use the seal 17 is submerged in water and must prevent the entrance of water into the space between the rings and about the propeller shaft. In addition the space between the rings is preferably filled with a grease before the seal is placed on the shaft and also oil moving down the propeller shaft enters the seal during the use of the latter.

Thus the boot together with the rings excludes water from the outboard end of the propeller shaft and serves also to enclose a bath of oil or other lubricant about such shaft portion. The flat surfaces 21 of the rings bearing against the propeller hub and the stern tube end respectively establish a smooth liquid tight contact with such parts as the rings wear in during use. A slight amount of oil or other lubricant may move radially through the radial grooves 22 in the surfaces 21 of the rings.

Since the rings are spaced from the shaft and have only bearing contact with the hub of the propeller and with the stern tube end it will be apparent that the seal is not driven. However it may float about the shaft. To prevent any and all torsional strain on the springs 25 and on the boot 30 the dowel pins 26 are provided and are fixed with one ring and enter the recesses 27 in the other ring whereby whenever the rings tend to rotate about or with the shaft they must rotate together. Yet the rings may move freely toward and from one another on compression and expansion of the coil springs 25.

Figure 6:
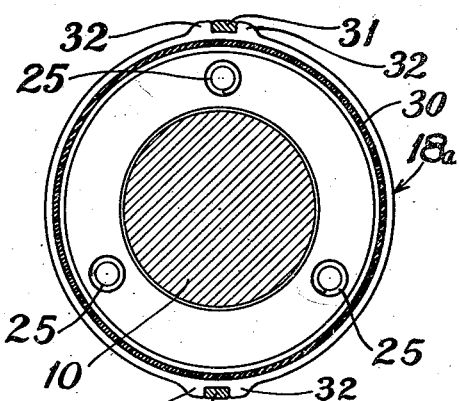
Fig. 6 is a sectional view taken as along the line 6—6 of Fig. 5.
Figure 1:
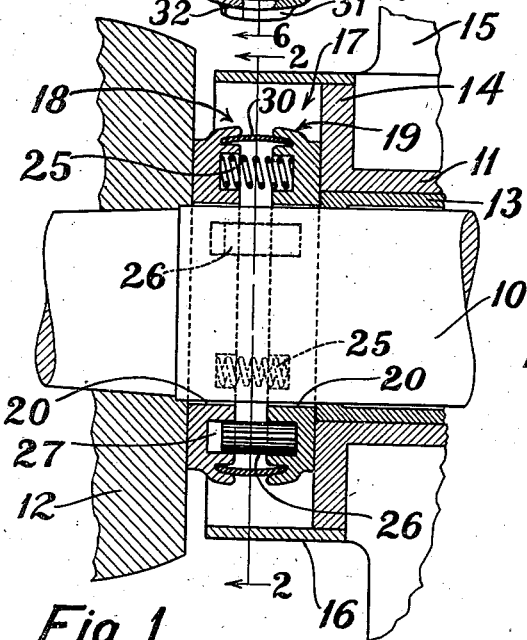
Fig. 1 is a sectional view showing the seal of the invention in place about the outboard end of a propeller shaft although as the description proceeds it will be clear that the seal of the invention may be applied to other shafts.
Figure 2:
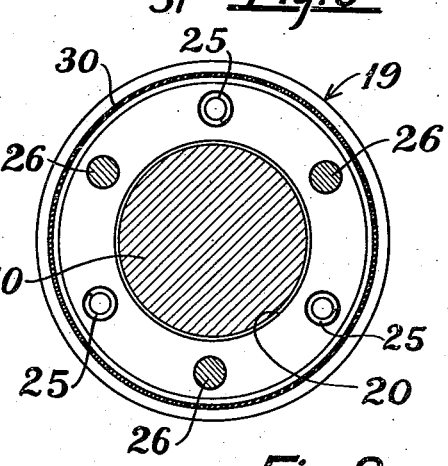
Fig. 2 is a sectional view taken as along the plane of the line 2—2 of Fig. 1 and showing one element or ring of the seal.
Figure 3:
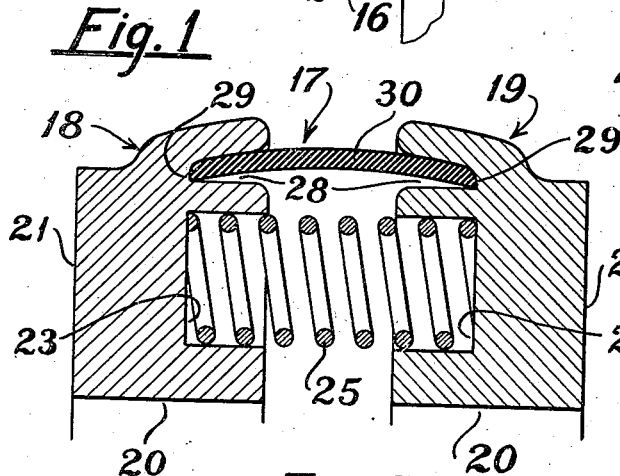
Fig. 3 is an enlarged detail sectional view of a portion of the seal showing details of construction.

Figs. 5 and 6 show a slightly modified construction wherein the rings 18a and 19a corresponding with the rings 18 and 19 respectively of the figures first described are connected for turning movement together by means of finger-like means 31 on the ring 19a and spaced pairs of lugs 32 on the ring 18a. Obviously the locations of the means 31 and 32 may be reversed. The finger-like means 31 have sliding fits between the pairs of lugs 32 whereby while the rings 18a and 19a must rotate together they may move toward and from one another as may be required by longitudinal movement of the propeller shaft 10.

Except for the omission of the dowel pins and the substitution of the finger-like means 31 and the lugs 32 the seal of Figs. 5 and 6 is the same as that disclosed in Figs. 1 through 4. In connection with the resilient boot it is noted that when the seal is being applied to a small diameter shaft the coil springs may be omitted and the resiliency of the boot depended on to maintain the rings (of either form) in their proper positions.

While the seal of the invention has been specifically described as applied to a propeller shaft of a ship it will be clear that it may be applied to various shafts about which a seal and particularly an oil seal is desirable. When the seal is applied to shafts other than ship's propeller shafts it is not necessary that the boot be of a material to resist water, as salt water, but in each instance the boot should be of a resilient material resistant to oil. The boot may be of a laminated construction whereby its inner and outer surfaces may be of different materials. For example, where a laminated construction of boot is employed the inner portion of the boot may be resistant to oil while the outer portion thereof is more resistant to salt water.

Having thus set forth the nature of my invention, what I claim is:

In an oil seal for propeller shafts, a pair of continuous metal rings disposed about the propeller shaft between the stern tube end and the propeller hub, one of said rings having a flat side bearing against said stern tube end, the other of said rings having a flat side bearing against the propeller hub, said rings of internal diameter clearing said propeller shaft so as to have free movement relative thereto, recesses in the opposing faces of said rings, coil springs disposed between said rings and having their respective end portions in said recesses, said springs serving to maintain the respective rings against the stern tube end and the hub of the propeller, continuous channels in the opposing faces of said rings outwardly of said recesses, a continuous tube-like boot of a resilient oil and water resisting material having its respective ends disposed in said channels, said boot of such length as to be longitudinally compressed between said rings when the latter are against the propeller hub and the stern tube end respectively, said channels tapering to their bottom walls, said tube-like boot having a substantially uniform wall of greater thickness than the width of said channels at their bottoms whereby the end portions of said tube-like boot are compressed by the walls of the channels and form therewith fluid tight seals, and means independent of said springs and boot and connecting said rings for rotary movement together as a unit but for movement toward and from one another along said shaft as the shaft shifts longitudinally during use.

ALEXANDER McNAB.